US007067831B2

(12) United States Patent
Ahrens et al.

(10) Patent No.: US 7,067,831 B2
(45) Date of Patent: Jun. 27, 2006

(54) PULSED SOLAR SIMULATOR WITH IMPROVED HOMOGENEITY

(75) Inventors: Klaus-Armin Ahrens, Kattendorf (DE); Carsten Hampe, Goettingen (DE); Heinrich Preitnacher, Markt Schwaben (DE)

(73) Assignee: EADS Astrium GmbH, Munich (DE)

( * ) Notice: Subject to any disclaimer, the term of this patent is extended or adjusted under 35 U.S.C. 154(b) by 194 days.

(21) Appl. No.: 10/777,897

(22) Filed: Feb. 13, 2004

(65) Prior Publication Data

US 2004/0223325 A1 Nov. 11, 2004

(30) Foreign Application Priority Data

Feb. 14, 2003 (DE) ................................ 103 06 150

(51) Int. Cl.
*G01J 1/00* (2006.01)

(52) U.S. Cl. ................................ 250/495.1; 250/504 R

(58) Field of Classification Search .............. 250/495.1
See application file for complete search history.

(56) References Cited

U.S. PATENT DOCUMENTS 4,641,227 A 2/1987 Kusuhara
5,984,484 A * 11/1999 Kruer ............................ 362/1
6,154,034 A * 11/2000 Lovelady et al. ........... 324/501
6,548,819 B1 * 4/2003 Lovelady ................. 250/495.1

FOREIGN PATENT DOCUMENTS

| | | |
|---|---|---|
| DE | 1910505 | 2/1965 |
| DE | 1948399 | 10/1966 |
| DE | 8528660.5 | 4/1987 |
| DE | 19631188 | 2/1998 |
| DE | 20103645 | 6/2001 |
| EP | 1139016 | 10/2001 |

* cited by examiner

*Primary Examiner*—Nikita Wells
*Assistant Examiner*—David A. Vanore
(74) *Attorney, Agent, or Firm*—Greenblum & Bernstein, P.L.C.

(57) ABSTRACT

Solar simulator that includes a pulsed radiation source for generating electromagnetic radiation, and at least one mirror element is arranged in a region of the radiation source. The at least one mirror element is structured and arranged to reflect components of radiation from the radiation source essentially in an intended irradiation direction. Further, the at least one mirror element, formed at least in part of metal, is positioned adjacent to the radiation source and is structured to receive at least a part of an ignition voltage of the pulsed radiation source. The instant abstract is neither intended to define the invention disclosed in this specification nor intended to limit the scope of the invention in any way.

29 Claims, 4 Drawing Sheets

PULSED SOLAR SIMULATOR WITH IMPROVED HOMOGENEITY

CROSS-REFERENCE TO RELATED APPLICATIONS

The present application claims priority-under 35 U.S.C. §119 of German Patent Application No. 103 06 150.9, filed on Feb. 14, 2003, the disclosure of which is expressly incorporated by reference herein in its entirety.

BACKGROUND OF THE INVENTION

1. Field of the Invention

The present invention relates to a pulsed solar simulator, and, in particular, a solar simulator that can be used for measuring solar cells such as single-junction solar cells and multi-junction solar cells.

2. Discussion of Background Information

Solar simulators are used to simulate natural sunlight to make it possible to study the effects of sunlight on certain objects to be irradiated, even under laboratory conditions. A special application is the study of the capacity of solar cells.

Solar simulators are known, e.g., from U.S. Pat. No. 4,641,227, in which simulation of sunlight is realized through a suitable arrangement and filtering of two independent radiation sources and a subsequent overlapping of the radiation emitted from these radiation sources. However, pulsed radiation sources are not used as radiation sources here. Focusing parabolic mirrors are arranged around these radiation sources at a distance such that the radiation sources are located respectively in the focus of the parabolic mirrors in order to focus the radiation in the direction of the target to be irradiated.

German Patent Application No. DE 201 03 645 describes a pulsed solar simulator with displaceable filter, in which the spectrum of a flash lamp is adjusted to the spectrum of the sun by suitable displaceable filters.

European Patent Application No. EP 1 139 016 describes a pulsed solar simulator in which, with the aid of flat mirror elements arranged at a distance from a pulsed radiation source, as a rule in parabolic form, the radiation source is arranged in the focus, which ensures an improved illumination of the target to be irradiated. The spectrum of the beam clusters reflected by the mirror elements can also be suitably adjusted with the aid of filters in order to achieve an additional irradiation of the target in a desired wavelength range.

However, none of these possibilities from the prior art gives an indication of how to achieve an improved homogeneity of the irradiation of the target to be irradiated.

SUMMARY OF THE INVENTION

The present invention provides an improved solar simulator arrangement, and, in particular, a solar simulator arrangement with improved homogeneity.

The solar simulator according to the present invention includes a pulsed radiation source for generating electromagnetic radiation and at least one mirror element arranged in a region of the radiation source. The at least one mirror element reflects components of the radiation of the radiation source essentially in a direction of the irradiation direction of the solar simulator. In this way, the at least one mirror element can be arranged in particular perpendicular to the irradiation direction. According to the invention, the at least one mirror element is arranged directly adjacent to the radiation source, and is embodied or formed at least in part of metal. Moreover, at least a part of the ignition voltage of the pulsed radiation source is applied to the at least one mirror element.

In contrast to the prior art mentioned at the outset, in the present invention, the mirror element is not arranged apart from the radiation source. Instead, the mirror element is directly adjacent to the radiation source. In particular, a radiation source can be used with a spectral width and/or a spectral intensity distribution that largely corresponds to the spectral width and/or the spectral intensity distribution of sunlight.

If now, as in the case of the present invention, the mirror element is embodied or formed at least in part of metal, a voltage can be applied to the mirror element. In particular, a substructure group or a constructional sub-element of the mirror element, such as, e.g., a frame, a holder or the mirror surface can be embodied or formed entirely or in part of metal. The applied voltage supports the pulsed ignition of the radiation source and thereby helps to make a homogenous ignition of the radiation source. In this regard, gas-filled tubes are generally used as radiation sources, and an ignition voltage is applied to these tubes via suitably arranged electrodes. Alternatively to an ignition voltage used specially for the ignition or in addition to this ignition voltage, a constant voltage can be applied to the ends of the gas-filled tubes. With such radiation sources, upon ignition, a luminous discharge is transmitted from one electrode through the tube to the other electrode, which leads to an inhomogeneous radiation effect. The application of an additional voltage to the mirror element directly adjacent to the radiation source leads to a much quicker and more homogenous ignition of the radiation source. Thus, according to the invention, the mirror element is positioned adjacent the radiation source, and preferably is positioned to directly abut against the radiation source in order to achieve the best possible effect upon ignition and, thus, the best possible homogeneity.

In addition, the mirror element reflects radiation components of the radiation source that are irradiated against the desired irradiation direction of the solar simulator. Thus, the level of effectiveness of the radiation source is increased, whereby overall less energy is required. Moreover, the radiation source can be operated with lower power with the result that the maximum of the irradiation spectrum shifts into the infrared range. This is a desirable and advantageous effect, since, particularly in the infrared range, conventional solar simulators exhibit a radiation intensity that is too low compared to the solar spectrum. The homogeneity of the irradiation is also advantageously improved through the reflection effect of the mirror elements in the direction of the irradiation direction of the solar simulator.

A first further development of the present invention provides that the at least one mirror element is embodied or formed in a planar manner. A very homogenous illumination of the target to be irradiated can be achieved precisely in this manner.

Furthermore, it can be provided that the at least one mirror element, in particular the mirror surface of the mirror element, features a material or a coating that is embodied or formed such that the reflection effect of the mirror element is much higher in the infrared range than in the UV range. In particular, a highly reflecting material or a highly reflecting coating is suitable for this which features a reflection effect that is greater than 60%, preferably greater than 70%, ideally greater than 90% in the infrared range. Thus, the resulting spectrum can also be influenced in the desired manner through the suitable selection of the material or the coating of the mirror element, namely towards an increase in intensity in the infrared range. In particular, it can thereby be provided that the at least one mirror element is made completely or partially of gold or features a coating that is made of gold or a gold-containing alloy. However, it can also be provided that the at least one mirror element features a metal layer with an oxide layer, in particular a light metal, e.g., aluminum. However, this metal layer can also be coated with a suitable coating as described above, which coating features the desired reflection effect. However, alternatively, the mirror element can also feature a semiconductor layer, e.g., silicon, with an oxide layer, in which the oxide layer can also be provided with still another coating, e.g., of metal, in particular of aluminum. The semiconductor oxide layer can be embodied or formed in particular as a thermal oxide layer such as is produced in a thermal oxidation process. A virtually monocrystalline semiconductor oxide layer is thus obtained which features a very precisely defined boundary surface to the adjacent semiconductor material. A metal layer can then be applied to the oxide layer, e.g., by vaporization.

It has been shown that metals such as gold as well as metals with oxide layers, such as in particular light metals and also semiconductors with oxide layers, feature very good reflection properties particularly in the infrared range. These materials in particular can therefore be used within the scope of the current invention in an advantageous manner.

Another improvement in the homogeneity of the irradiation of the solar simulator can be achieved in that the radiation source is embodied or formed in a curved manner in its longitudinal extension. An adequate homogeneity cannot be achieved through a straight extension of the radiation source, as is provided, e.g., by European Patent Application No. EP. 1 139 016, the disclosure of which is expressly incorporated by reference herein in its entirety. It can thereby be provided in particular that the radiation source is embodied or formed in a ring-shaped or helical manner.

The homogeneity of the irradiation can be increased even further in that the radiation source is surrounded by a housing that features several screen elements arranged one behind the other in the wall area in the irradiation direction. These screen elements intercept those radiation components of the radiation source that are not irradiated directly or chiefly in the direction of the irradiation direction. In addition, these screen elements can preferably be covered with a low-reflection coating or can be made of a low-reflection material in order to largely eliminate scattered radiation.

A preferred further development of the invention provides that the radiation source and/or the mirror element is connected to a carrier plate of granite via holders. The surface of the carrier plate is thereby either smoothly polished or microscopically roughened in order to have a reduced reflection effect. Such a granite plate has proven to be an ideal carrier plate which has a high stability, in particular also a high temperature stability, as well as also the necessary stability and insulation effect with respect to the high voltages applied via the holders and conducting feeds to the radiation source and/or the at least one mirror element.

In particular, the radiation source can be embodied or formed as a xenon flash lamp. Furthermore, as fundamentally known from German Patent Application No. DE 201 03 645, the disclosure of which is expressly incorporated by reference herein in its entirety, additional filter units can be provided in order to influence still further the spectrum of the solar simulator in the desired manner. In order to be able to vary still further the spectrum of the radiation striking in the radiation plane, it can be provided that at least two filters are arranged in a displaceable manner essentially perpendicular to the irradiation direction, such that the filters are embodied or formed to suppress respectively either the same or different components of the radiation. As a total spectrum, an overlapping of the radiation components that have not passed through a filter, the radiation components that have passed through the first filter and the radiation components that have passed through the second filter or even further filters thus now results. If the filters are arranged so that they can be pushed over one another, in addition radiation components result that have passed through first a first filter and then a second filter or even further filters.

For a special use of the solar simulator for measuring solar cells, it can be provided that solar cells to be measured are arranged in a radiation plane, whereby additional reference solar cells for comparison measurements can be arranged in the radiation plane. Thus, in any case, the same radiation acts on the reference solar cells as acts on the solar cells to be measured. The solar cells to be measured can then, e.g., be embodied or formed such that at least one first solar cell layer is arranged over a second solar cell layer, such that the solar cell layers feature a different absorption behavior. Such solar cells are also known as multi-junction solar cells. To guarantee a clearest possible reference measurement, the reference solar cells are then formed by at least one first reference solar cell layer with an absorption behavior that corresponds to the at least one first solar cell layer and by at least one second reference solar cell layer adjacent to the first reference solar cell layer, the absorption behavior of which corresponds to the second solar cell layer. Further, a filter, placed upstream of the second reference solar cell layer, has an absorption behavior that corresponds to that of the first solar cell layer. This applies analogously to possible further solar cell layers. The reference solar cell layers are thus independent of one another, but they nevertheless simulate the conditions within the solar cell layers arranged one above the other which are to be measured. Of course, the arrangement can also be used to measure single-junction solar cells, likewise preferably with the aid of reference solar cells.

The present invention is directed to a solar simulator that includes a pulsed radiation source for generating electromagnetic radiation, and at least one mirror element is arranged in a region of the radiation source. The at least one mirror element is structured and arranged to reflect components of radiation from the radiation source essentially in an intended irradiation direction. Further, the at least one mirror element, formed at least in part of metal, is positioned adjacent to the radiation source and is structured to receive at least a part of an ignition voltage of the pulsed radiation source.

According to a feature of the invention, the intended irradiation direction corresponds to an irradiation direction of the solar simulator.

In accordance with another feature of the present invention, the at least one mirror element is a planar element.

The at least one mirror element can include a material or coating having a reflection effect that is much higher in an infrared range than in a UV range. Further, the coating may be composed of gold or gold-containing alloy, and at least parts of the at least one mirror element can be made of gold.

Moreover, the at least one mirror element can include either a semiconductor layer with an oxide layer or a metal layer with an oxide layer. The semiconductor layer with an oxide layer can include silicon and the metal layer with an oxide layer can include a light metal.

The radiation source may include an element having a longitudinal extension that is structured and arranged in a curved manner along the longitudinal extension. The element can be formed in a ring-shaped or helical manner.

According to a further feature of the invention; a housing can be structured and arranged to surround the radiation source, and the housing may include a plurality of screen elements arranged one behind the other, relative to the irradiation direction, in a wall area. The plurality of screens may be composed of a low reflection material or are coated with a low reflection material. Further, the plurality of screens can be structured and arranged to absorb scattered radiation. Still further, the plurality of screens can be movable in planes perpendicular to the intended irradiation direction. The plurality of screens can be movable independently of each other. Also, each of the plurality of screens absorb different radiation components, or each of the plurality of screens absorb same radiation components.

In accordance with a still further feature of the invention, a carrier plate is included. At least one of the radiation source and the at least one mirror element may be connected to the carrier plate via holders. Further, the carrier plate can be composed of granite.

According to still another feature of the present invention, The at least one mirror can directly abut the radiation source.

According to still another feature, the radiation source can include a xenon flash lamp.

The present invention is directed to a process of operating the above-described solar simulator. The process includes applying a voltage to the radiation source that is below an ignition voltage of the radiation source, and applying an ignition voltage to the at least one mirror. In this manner, a pulsed discharge is produced in the radiation source.

According to a feature of the invention, a voltage source applies the voltage to the radiation source and an ignition coil applies the ignition voltage.

The instant invention is directed to a process of operating a solar simulator. The process includes applying a constant voltage to a radiation source that is below an ignition voltage of the radiation source, and applying an high voltage to the at least one mirror positioned adjacent the radiation source. In this manner, a pulsed discharge is produced in the radiation source.

In accordance with a feature of the present invention, the at least one mirror can be positioned to directly abut the radiation source.

The radiation components emitted by the radiation source can be directly directed or reflectively directed in an intended irradiation direction. Further, the process may include reflecting more radiation components in an infrared range than in a UV range.

In accordance with yet another feature of the instant invention, the process can further include absorbing scattered radiation with filters arranged downstream from the radiation source, relative to the intended irradiation direction. The process can also include moving the filters in planes perpendicular to the intended irradiation direction.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
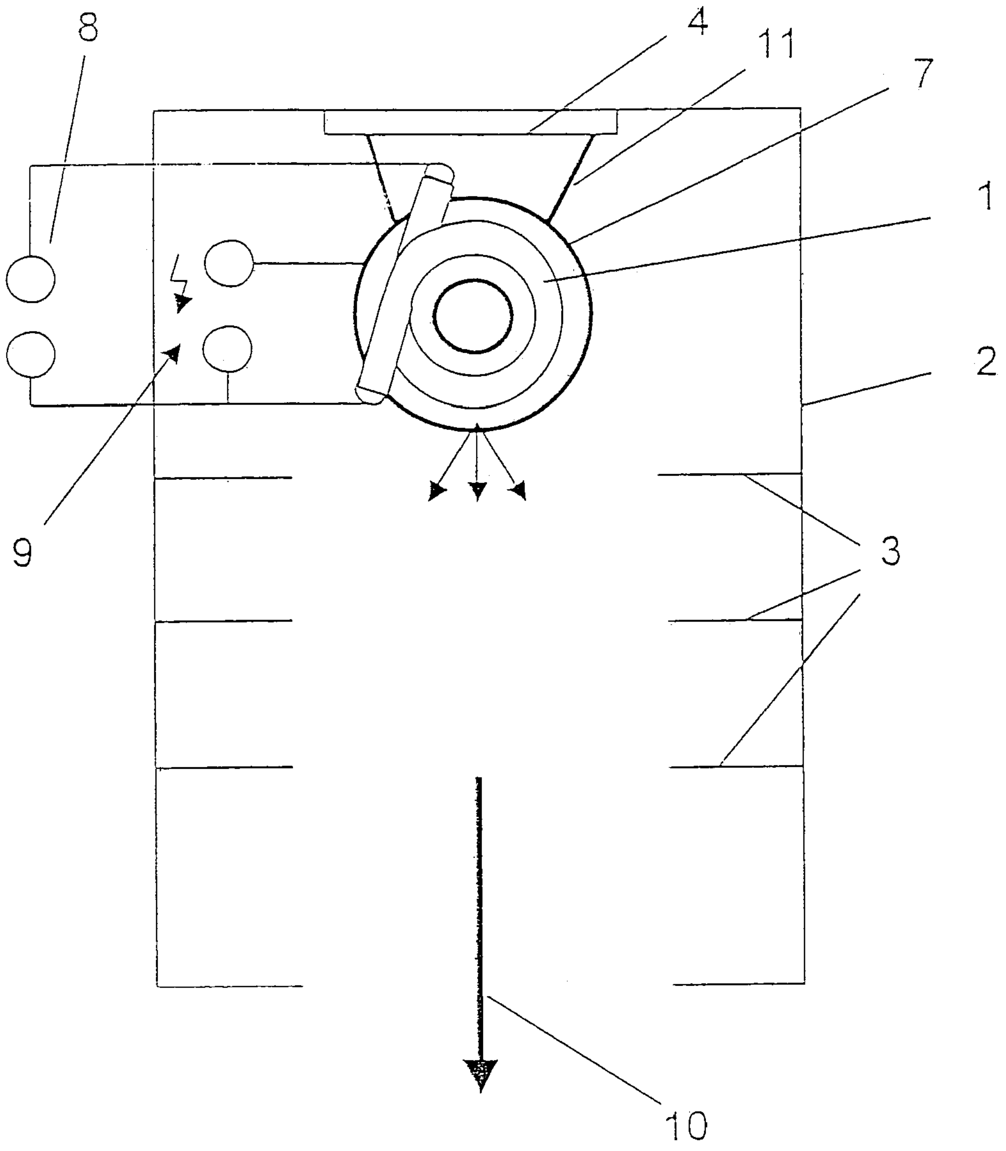
FIG. 1 illustrates a simplified view of a solar simulator.

FIG. 1 shows a radiation source 1 with a mirror element 7 in the paper plane merely to simplify the representation. In fact, radiation source 1 and mirror element 7 are arranged in a plane perpendicular to the irradiation direction 10 of the solar simulator, i.e., perpendicular to the page, so that the mirror reflects the radiation in a downward direction relative to the exemplary figure, as illustrated in FIG. 5.

Figure 5:
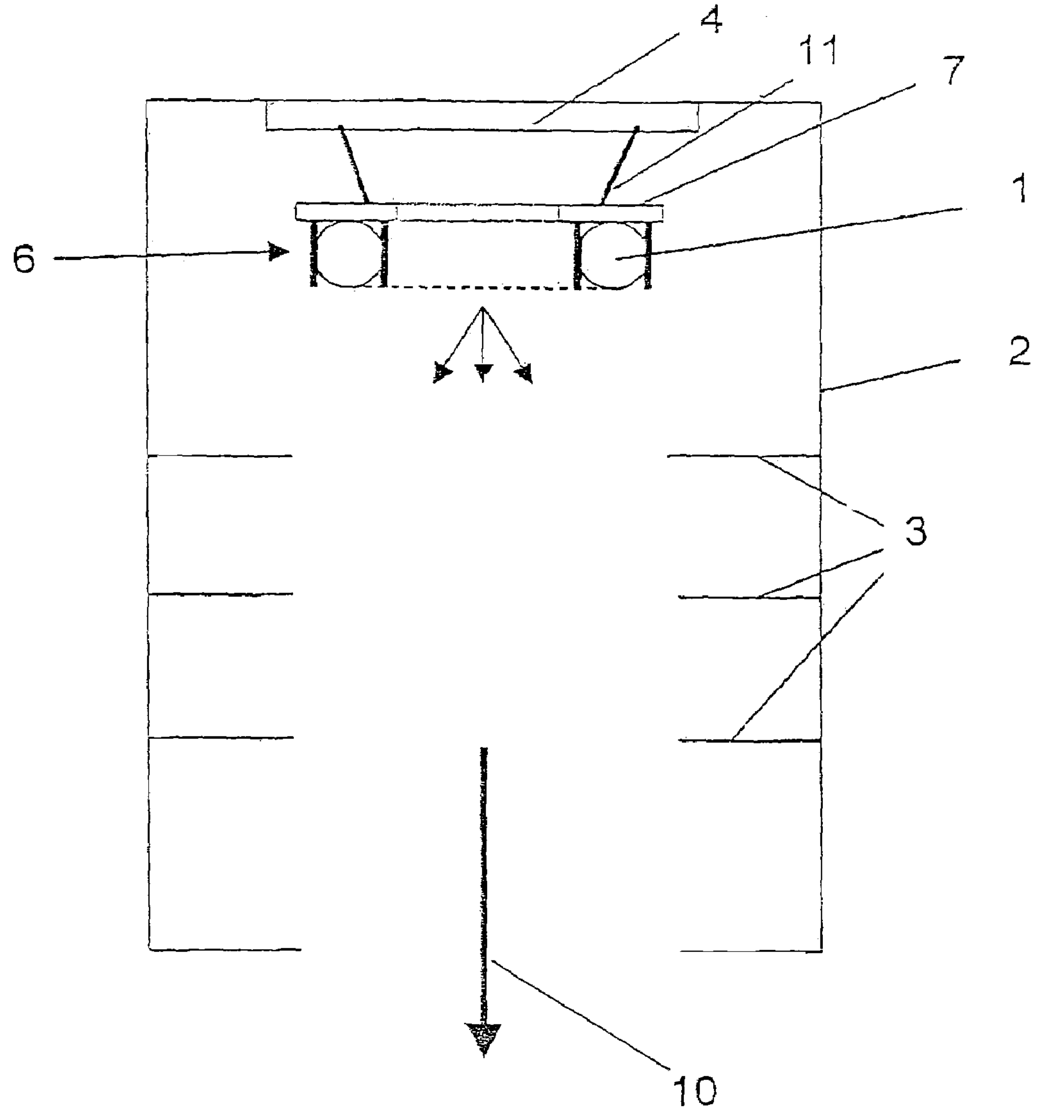
FIG. 5 illustrates the simplified view of the solar simulator depicted in FIG. 1 in accordance with the features of the present invention.

FIGS. 1 and 5 show in diagrammatic form a solar simulator according to the present invention, which features a radiation source 1 in the form of a xenon flash lamp to which one or more mirror elements 7 are directly adjacent. Exemplary arrangements of radiation source 1 and mirror elements 7 are depicted in more detail in FIGS. 2 and 3, such that mirror elements 7 rest directly against the tube bodies of xenon flash lamp 1. As the figures show, the flash lamp is embodied or formed in a helical manner in order to obtain the most homogenous possible irradiation. The number and form of mirror elements 7 can be adapted so that mirror elements 7 rest directly against their tube bodies and, if possible, over the entire longitudinal extension of flash lamp 1. This is shown by way of example in FIG. 2 for two mirror elements 7. They can be connected to the tube body of flash lamp 1, in particular via corresponding holders 6, such as, e.g., clamping holders, such that these holders are preferably embodied or formed of metal. Holders 6 should here be understood to be part of mirror elements 7. Mirror elements 7 are made of aluminum and feature a gold coating. However, mirror elements 7 can also be made completely of gold. However, it can also be provided that mirror element 7 feature a metal layer with an oxide layer, e.g., aluminum. Alternatively, the mirror element can feature a semiconductor layer, e.g., silicon, with an oxide layer, whereby the oxide layer can also be provided with another coating, e.g., of aluminum. The semiconductor oxide layer can be embodied or formed as a thermal oxide layer as is produced in a thermal oxidation process. The aluminum layer can be applied to the oxide layer then by vaporization. The following is based on a mirror element 7 of aluminum with a gold coating.

Figure 2:
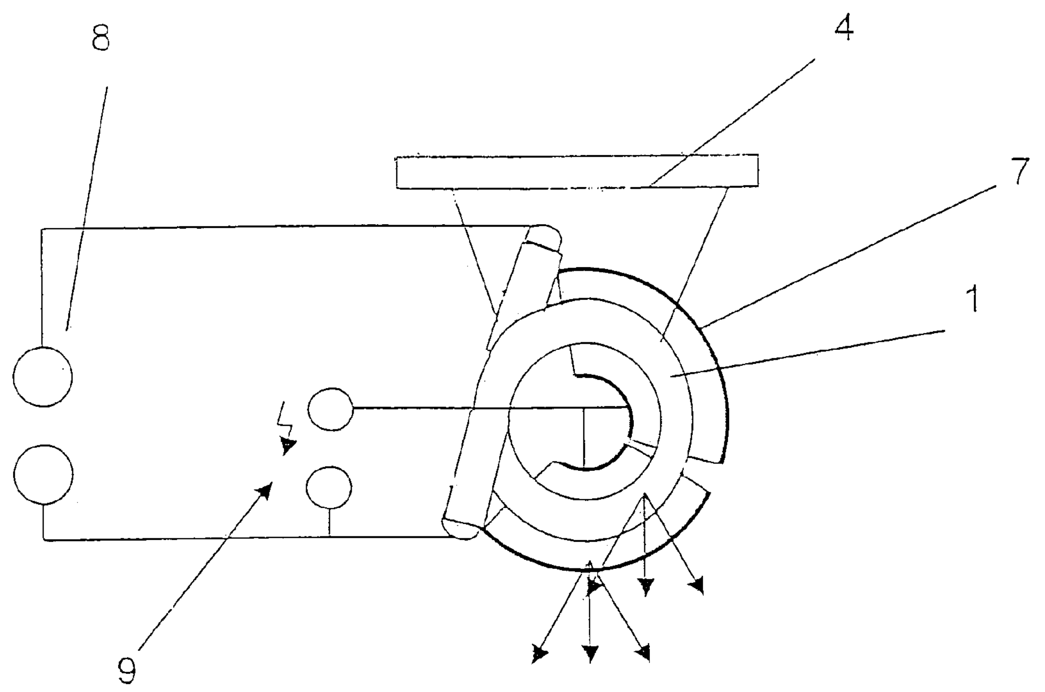
FIG. 2 illustrates an enlarged detailed representation of the radiation source of the solar simulator according to the invention.
Figure 3:
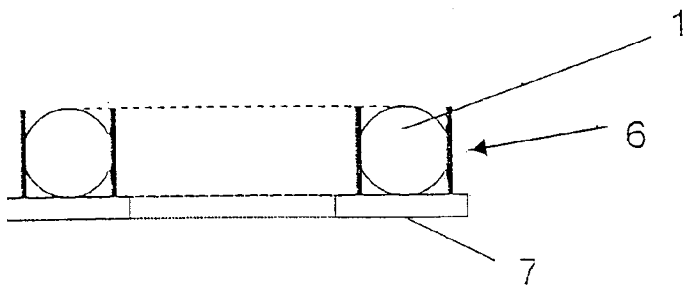
FIG. 3 diagrammatically represents a cross section through the radiation source depicted in FIG. 2.

As FIG. 1 further shows, a constant voltage is applied to electrodes at the ends of flash lamp 1, which voltage is generated by a voltage source 8. This voltage is designed so that it is not sufficient to ignite flash lamp 1, i.e., it therefore lies below the ignition voltage. Typically, while several kilovolts can be generated by voltage source 8, the constant voltage applied to lamp 1 is between 600 V and 1000 V, and preferably 800 V. Furthermore, a high-voltage potential as ignition voltage is applied at mirror elements 7 and/or holders 6, as shown by FIGS. 1 and 2. The high voltage potential applied to mirror elements 7 and/or holders 6 can be generated, e.g., by high-voltage source 9, such as, e.g., an ignition coil and is typically several tens of kilovolts. For example, the high voltage applied to the reflectors is between 10 kV and 20 kV, and preferably 15 kV. Through this ignition voltage, a pulsed discharge can now be produced in flash lamp 1. The ignition voltage produces only an electric field in the area of the tube body of flash lamp 1. However, virtually no current flows, since mirror elements 7 and/or holders 6 are insulated by the tube body of flash lamp 1.

As already explained, the special type of arrangement of mirror elements 7 directly adjacent, i.e., directly resting against the tube body of flash lamp 1 improves the homogeneity of the irradiation through the reflection effect of mirror elements 7 (see FIG. 2), which, through the construction of the mirror elements 7, e.g., gold or gold coating or materials with an oxide layer as discussed above, advantageously takes place above all in the infrared range. Moreover, homogeneity is further improved through the effect of mirror elements 7 and/or holders 6 as high-voltage electrodes that guarantee the homogeneity of the discharge in flash lamp 1 at the ignition process.

FIG. 1 furthermore shows that flash lamp 1 and mirror elements 7 are connected via holders 11 to a granite carrier plate 4. Carrier plate 4 features the advantages already listed at the outset. Furthermore, the arrangement of flash lamp 1 and mirror elements 7 is surrounded by a housing 2 that features several screen elements 3 arranged one behind the other in a wall area in irradiation direction 10 of the solar simulator. If the housing is embodied or formed, e.g., cylindrically, screen elements 3 are embodied or formed as concentric rings arranged one after the other. Furthermore, at least screen elements 3, but ideally also the entire interior area of housing 2, are provided with a low-reflection coating or are made of a low-reflection material, i.e., a material that does not reflect scattered radiation, but ideally largely absorbs it. It is thus achieved that the solar simulator largely radiates like a black body or like a cavity radiator.

Figure 4:
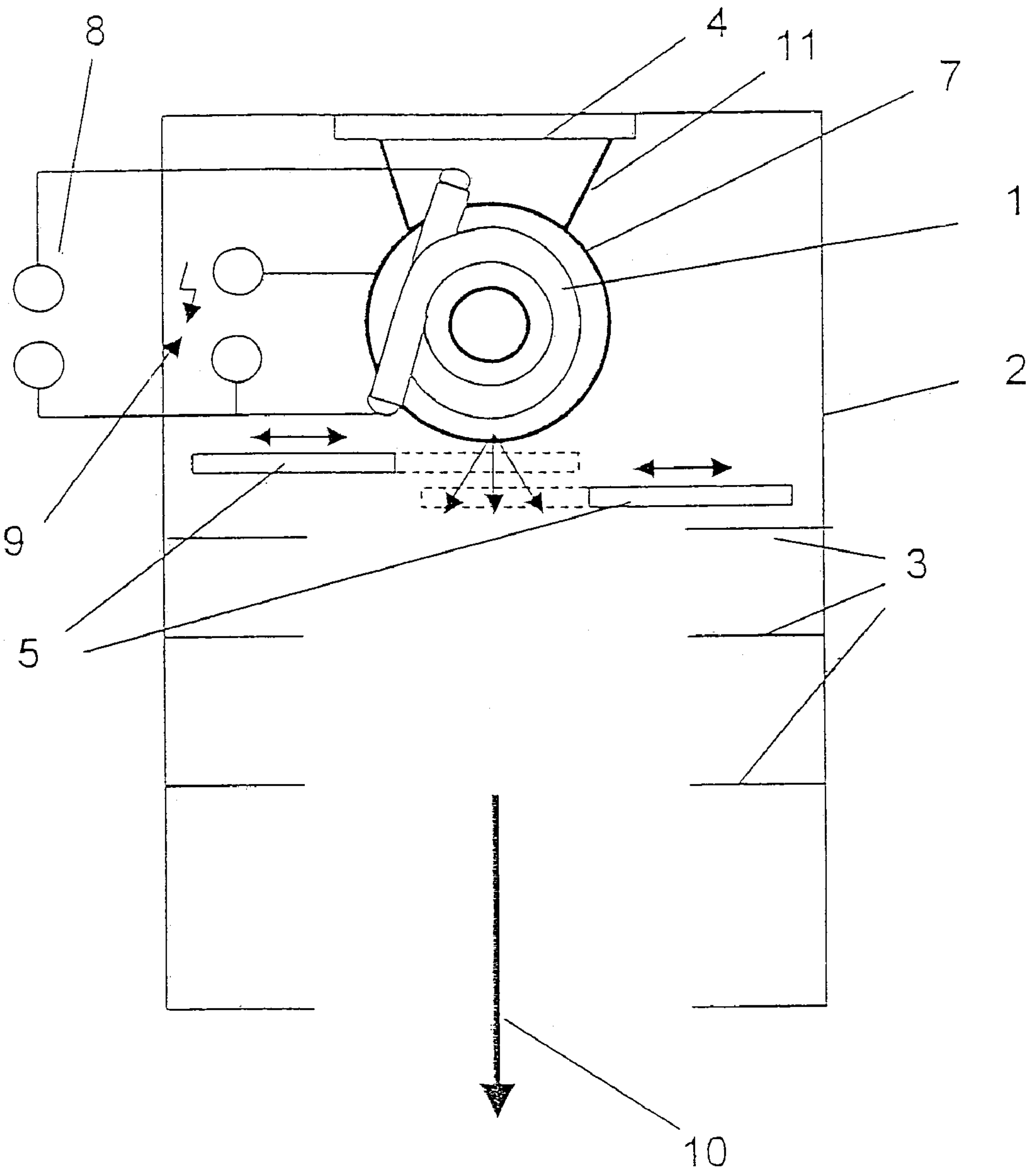
FIG. 4 illustrates a variant of the solar simulator depicted in FIG. 1 with additional displaceable filters.

The present solar simulator can also be further developed according to FIG. 4 in that displaceable filters 5 are arranged perpendicularly to irradiation direction 10, which filters can preferably also be pushed over one another as indicated by the dotted lines in FIG. 4. Such displaceable filters are fundamentally known from German Patent Application No. DE 201 03 645. Filters 5 can suppress either the same or different components of the electromagnetic radiation of flash lamp 1, as already shown at the outset. By way of example, filters 5 can be formed of quartz glass, e.g., Herasil, or other suitable material.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A solar simulator comprising:

a pulsed radiation source for generating electromagnetic radiation;

at least one mirror element arranged in a region of said radiation source, said at least one mirror element being structured and arranged to reflect components of radiation from said radiation source essentially in an intended irradiation direction, said at least one mirror element, formed at least in part of metal, being positioned adjacent to said radiation source and being structured to receive at least a part of an ignition voltage of said pulsed radiation source.

2. The solar simulator in accordance with claim 1, wherein said intended irradiation direction corresponds to an irradiation direction of said solar simulator.

3. The solar simulator in accordance with claim 1, wherein said at least one mirror element is a planar element.

4. The solar simulator in accordance with claim 1, wherein said at least one mirror element comprises a material or coating having a reflection effect that is much higher in an infrared range than in a UV range.

5. The solar simulator in accordance with claim 4, wherein said coating is composed of gold or gold-containing alloy.

6. The solar simulator in accordance with claim 5, wherein at least parts of said at least one mirror element are made of gold.

7. The solar simulator in accordance with claim 1, wherein said at least one mirror element comprises either a semiconductor layer with an oxide layer or a metal layer with an oxide layer.

8. The solar simulator in accordance with claim 7, wherein said semiconductor layer with an oxide layer comprises silicon and said metal layer with an oxide layer comprises a light metal.

9. The solar simulator in accordance with claim 1, wherein said radiation source comprises a element having a longitudinal extension that is structured and arranged in a curved manner along said longitudinal extension.

10. The solar simulator in accordance with claim 9, wherein said element is formed in a ring-shaped or helical manner.

11. The solar simulator in accordance with claim 1, further comprising a housing structured and arranged to surround said radiation source; and said housing comprising a plurality of screen elements arranged one behind the other, relative to said irradiation direction, in a wall area.

12. The solar simulator in accordance with claim 11, wherein said plurality of screens are composed of a low reflection material or are coated with a low reflection material.

13. The solar simulator in accordance with claim 11, wherein said plurality of screens are structured and arranged to absorb scattered radiation.

14. The solar simulator in accordance with claim 11, wherein said plurality of screens are movable in planes perpendicular to said intended irradiation direction.

15. The solar simulator in accordance with claim 14, wherein said plurality of screens are movable independently of each other.

16. The solar simulator in accordance with claim 14, wherein each of said plurality of screens absorb different radiation components.

17. The solar simulator in accordance with claim 14, wherein each of said plurality of screens absorb same radiation components.

18. The solar simulator in accordance with claim 1, further comprising a carrier plate, wherein at least one of said radiation source and said at least one mirror element is connected to said carrier plate via holders.

19. The solar simulator in accordance with claim 18, wherein said carrier plate is composed of granite.

20. The solar simulator in accordance with claim 1, wherein said at least one mirror directly abuts said radiation source.

21. The solar simulator in accordance with claim 1, wherein said radiation source comprises a xenon flash lamp.

22. A process of operating the solar simulator according to claim 1, said process comprising:

applying a voltage to the radiation source that is below an ignition voltage of the radiation source; and applying an ignition voltage to the at least one mirror, whereby a pulsed discharge is produced in said radiation source.

23. The process in accordance with claim 22, wherein a voltage source applies the voltage to the radiation source and an ignition coil applies the ignition voltage.

24. A process of operating a solar simulator, said process comprising:

applying a constant voltage to a radiation source that is below an ignition voltage of the radiation source; and applying an high voltage to the at least one mirror positioned adjacent the radiation source, whereby a pulsed discharge is produced in said radiation source.

25. The process in accordance with claim 24, wherein the at least one mirror is positioned to directly abut the radiation source.

26. The process in accordance with claim 24, wherein the radiation components emitted by the radiation source are directly directed or reflectively directed in an intended irradiation direction.

27. The process in accordance with claim 26, further comprising reflecting more radiation components in an infrared range than in a UV range.

28. The process in accordance with claim 24, absorbing scattered radiation with filters arranged downstream from the radiation source, relative to the intended irradiation direction.

29. The process in accordance with claim 28, further comprising moving the filters in planes perpendicular to the intended irradiation direction.

* * * * *